United States Patent [19]
Viers

[11] 3,735,567
[45] May 29, 1973

[54] ENGINE EXHAUST FILTER-MUFFLER

[76] Inventor: Charles S. Viers, 352 Sexsmith Road, Richmond, British Columbia, Canada

[22] Filed: July 12, 1971

[21] Appl. No.: 161,855

[52] U.S. Cl. ............55/233, 23/284, 55/260, 55/276, 55/512, 60/310
[51] Int. Cl. ............B01d 50/00
[58] Field of Search............55/233, 276, 260, 55/DIG. 30, 512; 60/310; 23/284

[56] References Cited

UNITED STATES PATENTS

| | | |
|---|---|---|
| 1,606,032 | 11/1926 | Kolstrand............55/DIG 30 |
| 2,754,182 | 7/1956 | Ruth............23/284 |
| 2,878,107 | 3/1959 | Ruth............55/DIG. 30 |
| 3,100,376 | 8/1963 | Potter............55/DIG. 30 |

Primary Examiner—Bernard Nozick
Attorney—Fetherstonaugh and Co.

[57] ABSTRACT

A muffler having a filter housed in a compartment adjacent a tank containing gas cleaning water. Exhaust gas pressure is utilized to vapourize and circulate a gas-water mixture through the tank and over the filtering material in such a way as to improve the gas washing and filtering action and to prevent the unit from becoming clogged with the extracted contaminants.

2 Claims, 3 Drawing Figures

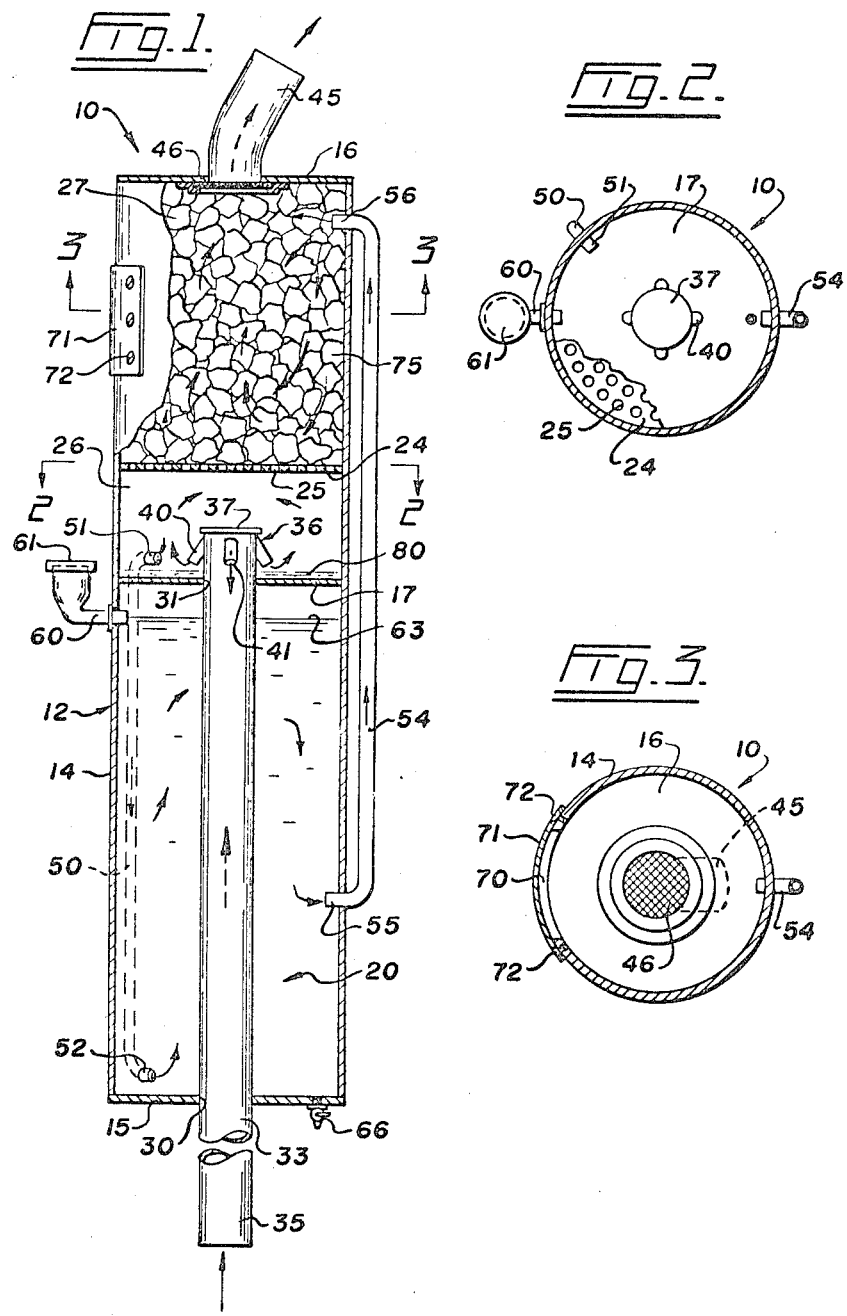

ns the filter-muffler,

FIG. 2 is a transverse section taken on the line 2—2 of FIG. 1, and

FIG. 3 is a transverse section taken on the line 3—3 of FIG. 1.

Referring to the drawings, the numeral 10 indicates generally one form of the present muffler which is the type intended for use on a truck or the like whereon the device normally stands upright behind the truck cab.

This particular filter-muffler 10 comprises a cylindrical casing 12 which has a peripheral wall 14, a lower end wall 15, and an upper end wall 16. An intermediate wall 17 extends across the casing 12 approximately midway between the end walls 15 and 16, this intermediate wall providing said casing with a water tank 20. The remainder of the casing 12 is divided by a transversely extending baffle 24, having a plurality of regularly spaced perforations 25, into a pressure chamber 26 and a relatively large filter compartment 27.

Central openings 30 and 31 are formed in the walls 15 and 17 respectively and extending through these openings is an exhaust pipe 33, the pipe being welded or otherwise secured to said walls to seal said openings. This longitudinally extending exhaust pipe 33 has an intake end 35 which is suitably connected in the usual manner to the intake manifold of the truck engine. Discharge end 36 of the pipe 33 is fitted with an end closure 37 and, below this end closure, said discharge end is provided with a number of circumferentially spaced nozzles 40. The nozzles 40 are directed downwardly away from the perforated baffle 24 or towards the top of the intermediate wall 17, the nozzle outlets 41 being spaced a short distance above said intermediate wall.

A short outlet pipe 45 is secured to the center of the upper end wall 16 to communicate with the interior of the filter compartment 27. On the underside of the end wall 16, there is a circular screen 46 which covers the lower end of the open-ended outlet pipe 45.

The pressure chamber 26 and the interior of the tank 20 are connected by a length of tubing 50. This tube 50 has an inlet end 51 which projects into the chamber 26 a short distance above the intermediate wall 17. Outlet end 52 of the tube 50 projects into the tank 20 near the lower end wall 15 thereof.

Another tube 54 places the water tank 20 into communication with the filter compartment 27. Tube 54 has an inlet end 55 and an outlet end 56.

A short distance below the end wall 17, the water tank 20 has a filler pipe 60 which is mounted on the peripheral wall 14. The outer end of the filler pipe 60 extends upwardly paralel to the wall 14 and is fitted with a removable cap 61. The tank 20 is adapted to be filled with water 63 preferably to the level of the pipe 60 as shown in FIG. 1.

A drain cock 66 is fitted to the lower end wall 15 whereby the contents of the tank 20 can be drained as might be necessary if the vehicle was left standing for long periods during exceptionally cold weather.

The compartment 27 is adapted to be filled with a suitable filtering material and for this purpose, the peripheral wall 14 is provided with the large rectangular access opening 70, see FIG. 3. A fluid tight cover 71 for the opening 70 is secured to wall 14 by means of screws 72.

I have found that the most suitable filtering material for the filter-muffler 10 is lime rock which is designated by the numeral 75 in FIG. 1. This lime rock 75 preferably is made up of pieces one-half to three-fourths of an inch in circumference and the pieces are packed quite tightly into the compartment 27 so that it is completely filled. The irregularly shaped rocks provide voids or passageways through which gas and water can find their way but the pervious filtering material does serve to retard fluid flow therethrough.

When the internal combustion engine is running, the exhaust fumes therefrom pass through the exhaust pipe 33 and are discharged into the compartment 26. The fumes initially are directed downwardly by the discharge nozzles 40 and later enter into the filter compartment 27 through the perforations 25. Since the outlet pipe 45 is partially blocked by the lime rock 75, a slight positive pressure builds up within the chamber 26. Gas under pressure travels down pipe 50 and enters the tank 20 where is bubbles up through the water 63 to pressurize the space immediately below wall 17. This pressure serves to force water through the pipe 54 so that it discharges into the compartment 27. Near the outlet pipe 45, the gas pressure is lower than in the chamber 26 so that the flow through the pipe 54 is as described rather than in a reverse direction.

The exhaust gases are discharged into the chamber 26 in such a way as to create a great deal of turbulence and this strong turbulence increases as the gases expand and move upwardly into the compartment 27. Water discharging from the outlet end 56 of the tube 54 is met by the turbulent gases and is broken up into a fine spray which is spread over the entire compartment 27 so as to wash over substantially all surfaces of the lime rock 75 which quickly becomes slaked. Surplus water which is sprayed into the compartment 27 drains downwardly through the perforated baffle 24 and forms a pool 80 on the intermediate wall 17. Water from the pool 80 is splashed upwardly by the gas jets emitting from the nozzles 40 and some of it is formed into spray which joins the circulation of water and gas within the chamber 26 and compartment 27. Some of the surplus pool water is forced down the tube 50 into the tank 20 to be reunited with the water therein. Thus the filter-muffler 10 operates to force water from the tank 20, to convert this water into a fine spray which is thoroughly mixed with the exhaust gases, and to recycle surplus water back to the supply source. This circulation is indicated by the numerous arrows which appear in FIG. 1.

I have found that this particular circulation serves to remove most of the contaminants from the exhaust fumes before there is any appreciable gas discharge through the outlet pipe 45 to atmosphere. Free carbon and other solid particles in the exhaust fumes appear to be effectively captured by the water and the lime rock. Other acid forming components of the exhaust gases are neutralized and/or absorbed by the lime rock 75 to such an extent that the discharge from the outlet pipe 45 has very little odour and is more or less harmless. The gas absorbing qualities of the lime rock do not appear to be impaired by the steady spray of water which is almost in the form of a mist and apparently this continual washing increases the effectiveness of the filtering material by preventing it from eventually becoming clogged by the contaminants. The exhaust gases are cooled by their passage through the filter-muffler and are emitted to atmosphere at a temperature which is quite bearable to touch.

Eventually, after a period which has not as yet been determined, it is expected the lime rock 75 will need to be replaced. This can readily be done by removing the cover 71 which enables the exhausted filtering material to be removed and replaced with fresh lime rock. The tank 20 will need to be topped up with water at suitable intervals although it has been found there is very little water loss from the filter-muffler unit.

The filter-muffler 10 has been described as used in the upright position but it will be appreciated the unit will operate just as effectively in a horizontal position as would be required on passenger cars and some trucks. Minor alterations have to be made to the positions of some of the parts of the filter-muffler to achieve the required circulation but otherwise the unit would function as described.

From the foregoing, it will be seen I have provided a simple yet effective device which will deaden the sound of the exhaust gases of an engine without causing excessive back pressure thereon. The gas is washed and filtered to remove most of the impurities therein whereby to effectively reduce atmospheric pollution and the washing action also serves to keep the unit from becoming clogged. The lime rock is inexpensive and long lasting in addition to be ideally suited for the type of cleaning and filtering which is required by vehicle exhaust.

I claim:

1. A filter-muffler adapted for connection to the exhaust manifold of an internal combustion engine and comprising a casing having a peripheral wall and an end wall at each opposite end of said casing, an intermediate wall extending across the casing spaced from one end wall and providing a water tank therebetween, a perforated baffle extending across the casing near the water tank to provide a filter compartment near the other end wall and a pressure chamber near the intermediate wall, an outlet pipe connected to the filter compartment at a point remote from the perforated baffle, a quantity of lime rock in the filter compartment; an exhaust pipe extending longitudinally through one end wall, the water tank, and the intermediate wall; said exhaust pipe having an intake end and a discharge end within the pressure chamber, said discharge end having a plurality of nozzles directed away from the perforated baffle, a first tube connecting the pressure chamber near the intermediate wall to the water tank near said one end wall, and a second tube connecting the water tank near said one end wall to the filter compartment near said other end wall.

2. A filter-muffler as claimed in claim 1, in which said filtering material is a quantity of lime rock.

* * * * *